April 16, 1940.  R. W. KEELER  2,197,183
ROAD ROLLER
Filed Aug. 20, 1936  2 Sheets-Sheet 2
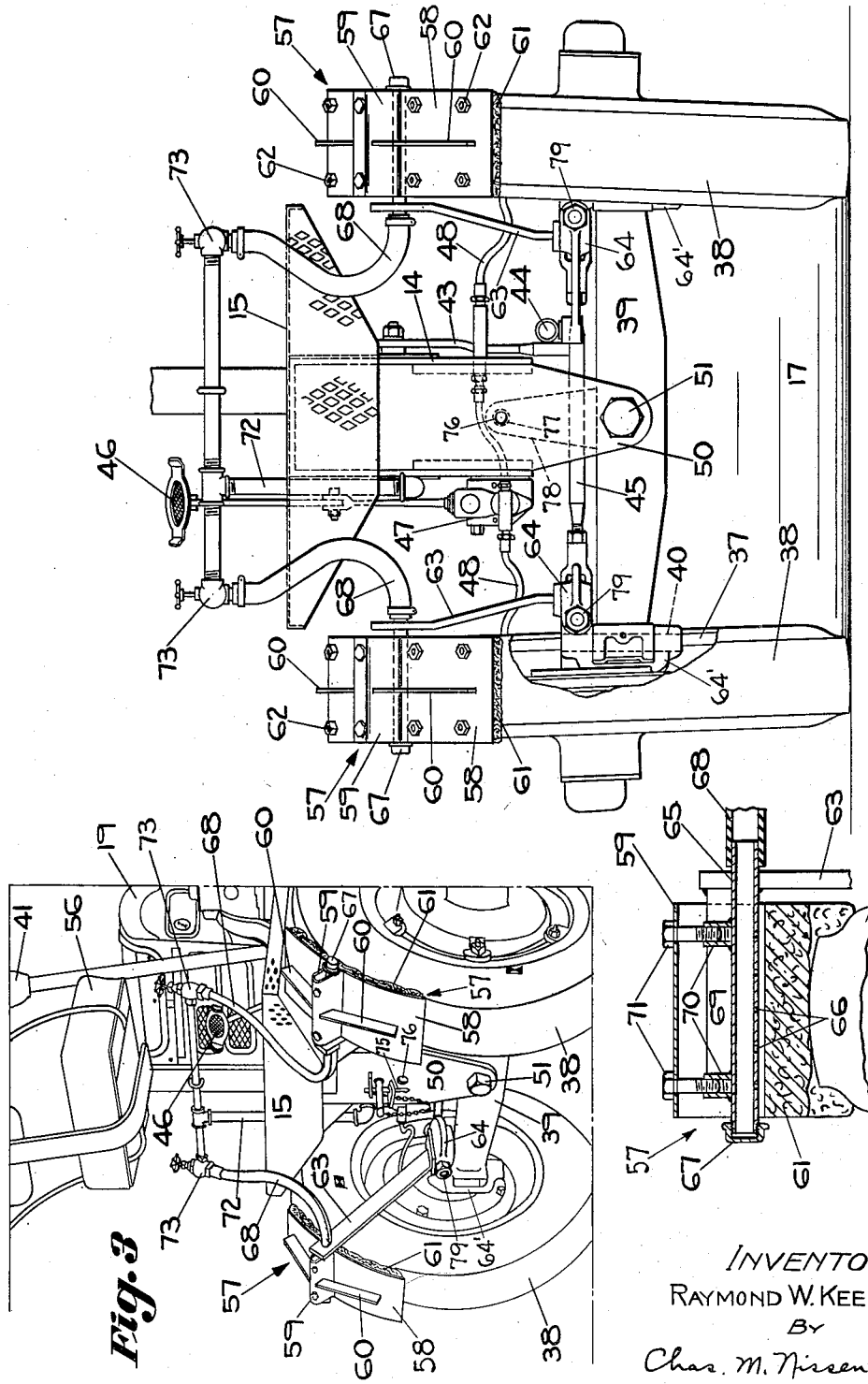
INVENTOR:
RAYMOND W. KEELER,
BY
Chas. M. Nissen,
ATT'Y.

Patented Apr. 16, 1940

2,197,183

UNITED STATES PATENT OFFICE 2,197,183

ROAD ROLLER

Raymond W. Keeler, Galion, Ohio, assignor to The Galion Iron Works & Manufacturing Company, a corporation of Ohio Application August 20, 1936, Serial No. 97,025

35 Claims. (Cl. 94—50)

This invention relates to a road roller, and particularly to a general utility roller which is useful for rolling all kinds of patch material as well as for rolling of driveways or lawns.

The principal object of the invention is to provide a portable roller with means to wet the contacting surfaces of the roller and wheels which engage the surface being rolled, particularly to prevent the surface material from adhering to said roller or wheels.

Other objects of the invention will appear hereinafter, the novel features and combinations being set forth in the appended claims.

In the accompanying drawings,

Fig. 2 is a rear end elevational view of the device of Fig. 1 with numerous parts omitted in the interest of clearness;

Fig. 3 is a perspective end view of a portion of the roller of my invention; and Fig. 4 is a sectional view taken on the line 4—4 of Fig. 1 looking in the direction of the arrows.

Figure 1:
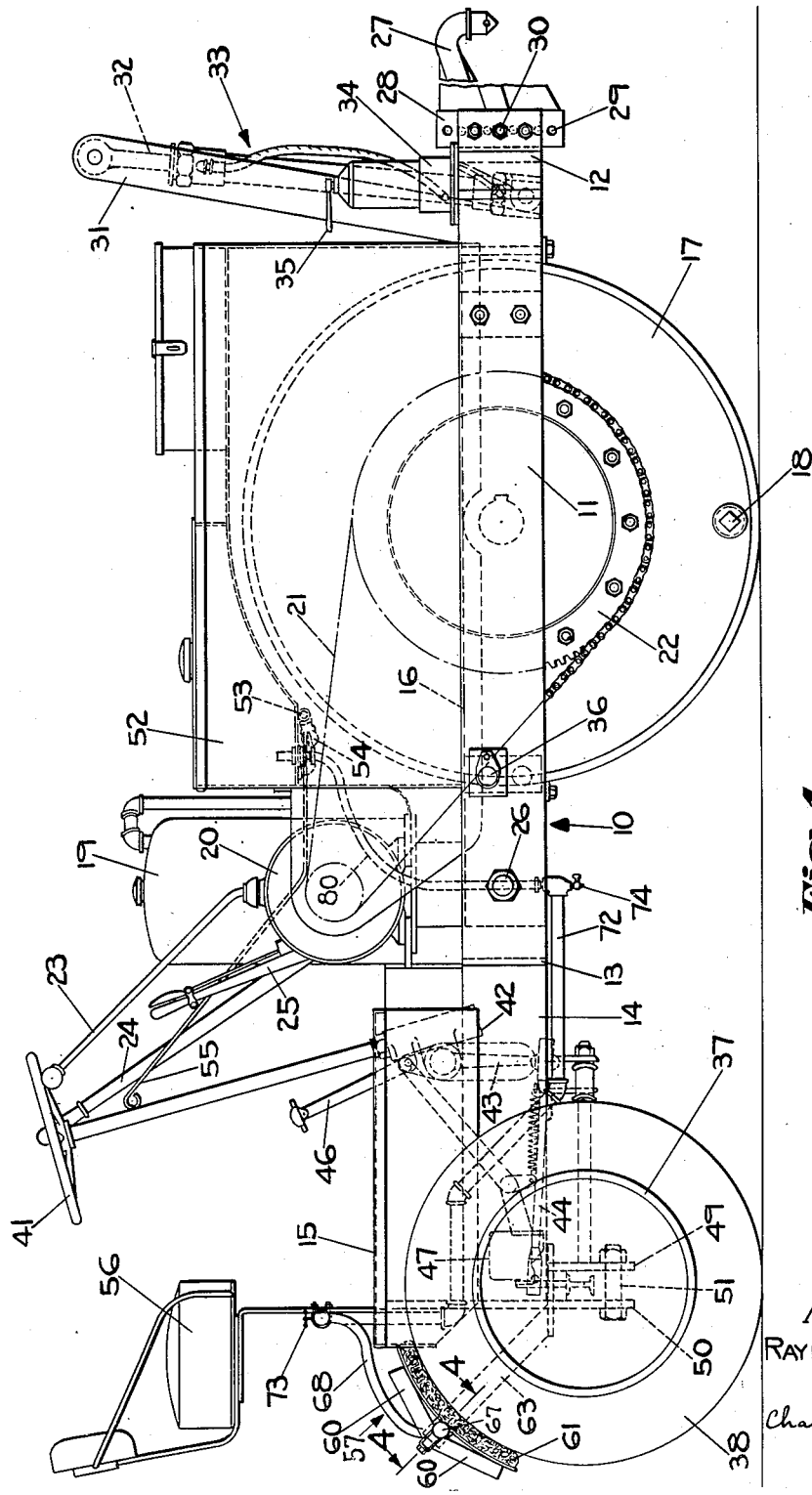
Fig. 1 is a side elevational view of the road roller comprising my invention.

The roller of my invention comprises a main frame 10 formed by a pair of rigidly attached longitudinally extending side members 11, 11, between which extends a transverse front end member 12 and a transverse rear end member 13. Extending rearwardly from the rear end member 13 and rigidly attached thereto, thus forming part of the main frame 10, is an inverted channel member 14, to the top of which is rigidly attached an operator's platform 15.

Mounted upon the main frame 10 is an auxiliary frame 16, upon which auxiliary frame is mounted a large cylindrical drum or roller 17. Said roller 17 is hollow and is provided with a removable plug 18 whereby it may be filled with liquid to any desired extent, thereby to vary its effective weight.

Also mounted upon the auxiliary frame 16 is a driving mechanism for the roller 17 comprising an internal combustion engine 19 which drives said roller 17 through appropriate gear mechanism 20, and through appropriate chain and sprocket mechanism 21, including the sprocket 22 which is attached to said roller 17. The gear mechanism 20 includes a two speed transmission mechanism operable by the lever 23, a reversible clutch mechanism operated by the lever 24, and a brake mechanism operated by the lever 25. Thus the road roller may be driven in either a forward or reverse direction and at either of two selected speeds in either direction. By moving the clutch lever 24 forward the roller will move in a forward direction at a selected speed, and by moving it rearwardly the roller will move in a rearward direction. In the normal position of the lever 24 both clutches will be disengaged and the road roller will stand still.

The auxiliary frame 16 is pivotally attached to the main frame 10 by pivot means 26, said auxiliary frame being adjustable about the axis of the pivot 26 either upwardly or downwardly. This is particularly useful where it is desired to transport the portable roller by attaching it to a unitary self-propelled truck with the roller 17 lifted off the road, the front portion of the main frame 10 then being supported by said hauling truck, the rear portion being supported by steering wheels, hereinafter described in full detail.

To provide for the attaching of the main frame 10 to said hauling truck, a goose-neck hook 27 is rigidly attached to the front end member 12 and may be adjusted in elevation by the plate 28 having a plurality of apertures 29 and cooperating in an adjustable manner with bolts 30.

To provide for relative adjustment between the main frame 10 and the auxiliary frame 16, and to provide for the maintaining of said frames in any desired relative positions, an attaching bracket 31 is attached at its bottom to the auxiliary frame 16 and at its top is pivotally attached to a piston rod 32 of a piston motor 33, preferably of the hydraulic type.

To expand the piston motor 33 I provide a hydraulic pump 34 adjacent the forward end of the main frame 10. Said pump 34 is provided with a control handle 35 which may be adjusted so that when said pump 34 is operated said piston motor 33 may be expanded or contracted. The handle 35 may also be so adjusted as to lock the piston motor 33 in any position to which it is adjusted.

To attach the hook 27 to a cooperating eye of a hauling truck, the pump 34 is first operated to elevate the front end of the main frame 10 with respect to the roller 17 so that the hook 27 will clear the bracket of the hauling truck to which it is to be attached. The pump 34 is then operated to lower the main frame 10 so that the hook 27 will engage the receiving bracket eye on said hauling truck. Further operation of the pump 34 in the same direction will transfer the load on the front end of the road roller from the roller 17 to the truck frame with a consequent elevating of said roller 17. After said roller 17 has been elevated a desired amount the road roller will be in condition to be transported.

To aid the piston motor 33 in holding the auxiliary frame 16 in any extreme adjusted position, such as the elevated transportation position, or the normal operating position, as illustrated in Fig. 1, I provide a pin 36 which extends through an appropriate aperture in the side member 11 and into one or the other of two cooperating apertures in the side member of the auxiliary frame 16. There are preferably provided two such pins 36, one on each side of the main frame 10.

The rear end of the main frame 10 is supported by a pair of steering wheels 37, 37, preferably provided with pneumatic rubber tires 38, 38, said wheels 37, 37 being mounted upon an axle 39 for pivotal movement about king pins, one of which is seen at 40.

To provide for the steering of said wheels 37, 37, I provide a steering mechanism including a wheel 41, reduction gearing 42, operating lever 43, connecting rod 44 and tie rod 45. The tie rod 45 is pivotally connected at its outer ends to the forward ends of the steering brackets 64 and the latter are bolted at 79, 79, in adjusted positions rigidly to the wheel axle knuckles 64', 64' which are pivoted by means of the king pins 40 to the outer ends of the axle 39. It will be evident that the operation of the steering wheel 41 will be effective to swing the wheels 37, 37 about their king pins 40, 40 in such a manner as to effectually steer the roller 17 during operation.

I also provide brake mechanism associated with the wheels 37, 37, which is preferably of the hydraulic type and comprises a foot pedal 46 for controlling a hydraulic pump mechanism 47 which applies hydraulic pressure through the leads 48, 48, to appropriate operating mechanism associated with the brakes which will be associated with the wheels 37, 37 in a manner well understood in the automobile art.

The axle 39 is pivotally attached to a downwardly extending bracket formed by forward and rearward vertical, parallel plates 49 and 50, respectively, which are rigidly attached to the channel member 14 forming a part of the main frame 10. It is thus seen that the axle 39 is free to pivot about the axis of the bolt 51. This is particularly useful when the roller is employed to roll in a gutter with one of the wheels 37 on the curb. However, when desired, the axle 39 may be locked against tilting on the pivot 51 by inserting the pin 75 through the perforations 76, 77 when the latter register. The perforation 77 is located in the upper end of the V-shaped plate 78 secured rigidly to the axle 39, as shown in dotted lines in Fig. 2.

It has been found in practice that some kinds of material when rolled have a tendency to adhere to the roller 17 and to the tires 38. This is particularly true of material such as crushed stone which has had a bituminous binder added thereto. In order to prevent this adherence of the material I provide means to moisten or wet the contacting surfaces of the drum or roller 17 and the tires 37. To this end I provide a water tank 52 on the auxiliary frame 16. Positioned below said tank 52 and extending transversely thereof, a distance substantially equal to the width of roller 17, I provide a spray pipe 53 having appropriate spray perforations therein, said pipe being connected to the tank 52 to receive water therefrom through an appropriate control valve 54. An operating lever 55 within easy reach of the operator, is provided for controlling the valve 54. It may be mentioned that an operator's seat 56 is provided upon the platform 15 whereby the operator may be within easy reach of all of the control levers previously described, as well as the steering wheel 41.

In order to provide for the moistening of the tires 38 there is provided in association with each of said tires 38 a water distributing and wiping mechanism indicated generally at 57. Each of such water distributing and wiping mechanisms 57 is formed by an arcuate carrier 58 which comprises two arcuate metal plates rigidly connected by a central U-shaped guide 59, as by welding. Reinforcing bars 60 extend between opposite sides of the U-shaped guide 59 for rigid attachment by welding to the two arcuate plates of the carrier 58. To the lower arcuate face of the carrier 58 is attached a wiping element preferably in the form of a coco-mat 61. Said coco-mat may be rigidly, but removably, attached to the carrier 58 by appropriate nuts and bolts 62, as shown in Fig. 2.

In order to support each of the water distributing and wiping mechanisms 57 in fixed relation to the axis of rotation of the wheel 37 with which associated, I mount each of the said mechanisms 25 upon a bracket formed by a rod 63 which is rigidly attached to the top of the steering bracket 64 of the steering mechanism. Thus the rod 63 oscillates with the wheel 37 during the steering thereof and always remains in fixed relation to the axis of rotation of the wheel.

The rod 63 carries at its top a spray pipe 65 provided with appropriate bottom spray apertures 66 which direct the water onto the coco-mat 61. The outer end of the pipe 65 is closed by a removable screw-threaded cap 67 and the inner end is attached to a hose 68. A reinforcing plate 69 is also attached to the rod 63 and to the top of the pipe 65. Also attached to the pipe 65 and the plate 69 are a pair of spaced threaded cylindrical sockets 70, 70 adapted to receive the screws 71, 71 which extend through apertures in the bight portion of the U-shaped guide 59, as shown in Fig. 4. The mat unit including the carrier 58 and the mat 61, may rest by gravity on the tire 38 and the cap 67 made of sufficient diameter to co-act with the support 63 to keep the mat unit on the tire, in which event the screws 71 may be omitted. However, I prefer to include the screws 71, 71 extending loosely through apertures in the guide 59, so as to space the mat unit from the cap 67 and the arm 63 and thereby permit a limited flexibility of tilting movement of the unit on an axis extending approximately through the under sides of the heads of the screws 71. The mat unit then automatically adjusts itself to the periphery of the rubber tire and assures better distribution of the water over the ground engaging periphery of the tire.

It will be evident that by adjusting the screws 71, the distributor and wiping mechanism 57 may be adjusted radially relative to the axis of rotation of the wheel 37. By unscrewing the screws 71 almost entirely from the screw-threaded sockets 70, the coco-mat 61 may be permitted to rest by gravity on the tire 38 while the screws 71 extend loosely through the perforations of the U-shaped guide 59. In other words, in normal operation the mere weight of the liquid distributor and wiping mechanism 57 may be relied upon to maintain the mat 61 in contact with the tire 38, in which event the screw-threaded cap 67 spans the outer edges of the U-shaped guide 59 to assist the screws 71 in preventing movement of the distributor 57 laterally away from its position at the periphery of the wheel. If desired, the distributor and wiping mechanism 57 may be so adjusted by means of the screws 71 as to be positioned slightly above the surface of the tires 38, but I prefer to adjust the screws 71 so that their heads bear down on the bracket 59 to effect a light, frictional engagement between the mat 61 and the periphery of the tire 38.

To supply water from the tank 52 to the distributors 57 through the flexible hose connections 68, I provide a pipe system 72 which leads from the bottom of the tank 52 and extends to a pair of valves 73, 73 one for each of the distributors 57. The valves 73 are individually operable so as to effect individual control of the supply of water to the mats 61. The section 80 of the pipe system is sufficiently flexible to permit tilting of the roller unit on the pivot 26.

The piping system 72 may also be provided with a drain cock 74 to drain it of fluid whenever desired. For instance, if a lawn is to be rolled, the distributors 57 may be entirely removed by removing the screws 71 and the caps 67, and the water drained from the piping system by opening the drain cock 74.

The water distributor and wiping devices 57 are useful not only to maintain the surface of the tires moist or wet to prevent adherence of material thereto, but are also useful when the machine is used as a roller to roll hot material during the process of patching a pavement. During such patching operations, the water applied to the tires by means of the distributors 57 will prevent the hot material from adhering to the tires and doing damage thereto.

It is common practice to pave or resurface roads with crushed stone and a binder of bituminous material, and the latter is sometimes laid down in a hot condition and rolled while still in a molten mass. The distributors 57 consisting of pads of absorbent material continually fed with water, are particularly useful in such an operation because they prevent not only the adherence of the stone and the hot binder to the tires, but also prevent the heat thereof from damaging the tires.

From the operator's station on the machine the flow of water from the tank 52 onto the rolling surface of the traction roller 17 is controlled, and from the same station by means of the valves 73 the flow of water from the tank 52 to the distributors 57 may also be controlled. It will thus be seen that the spraying of the water onto the cylindrical surface of the traction roller 17 will prevent the adherence of the hot rolled material to the roller while at the same time the spreading of water on the tires of the rear or steering wheels will prevent the adherence of the hot road material to the steering wheels and at the same time prevent injury to the rubber tires.

I have discovered by experiment and operation under practical conditions, that coco-mats are particularly desirable because they do not apply appreciable friction to the tires 38 and because they readily absorb and distribute the water to the peripheries of the tires 38 while water flows through the perforations 66 of the tubular nozzles 65. Consequently such a mat has a long life and is relatively inexpensive in cost.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a road-working machine, the combination with a vehicle comprising a wheel, of a wiper associated with the periphery of said wheel, a carrier for said wiper and comprising a U-shaped guide, a water distribution nozzle extending into said guide, a support for said nozzle, and mechanism between said guide and said nozzle for exerting pressure on said carrier to force said wiper into frictional engagement with said periphery.

2. A device for applying liquid to a tire comprising an arcuate carrier having a transversely extending U-shaped bracket, a perforated pipe extending into said bracket and attached thereto, and a coco-mat attached to said arcuate carrier to occupy a position adjacent said perforated pipe.

3. A road making machine comprising a ground engaging wheel, a mat, a nozzle comprising a perforated pipe extending transversely of said mat in position to supply said mat with water to wet the periphery of said wheel, a carrier for the mat comprising a U-shaped guide intermediate its ends, a support for said nozzle, and means comprising cap screws extending through openings in said U-shaped guide to threaded sockets on said pipe to hold the mat in place while resting on the wheel by gravity or to exert pressure on the mat to force the same against the periphery of said wheel, and a removable cap at the outer end of the nozzle in position to act as an abutment relative to said U-shaped guide to prevent the mat from moving laterally off the wheel.

4. In a road machine, the combination with a frame, of mechanism comprising a wheel for supporting the same, a mat of absorbent material having the shape of a segment of a cylinder, a carrier secured to said mat and comprising spaced metal plates connected by a U-shaped support, a nozzle comprising a perforated pipe extending into said U-shaped support transversely of said mat, mechanism for supporting said nozzle so as to remain in predetermined relation to the path of travel of the periphery of said wheel, spaced screw-threaded sockets on the upper side of said nozzle, and spaced screws threaded into said sockets and extending through perforations in the bight portion of said U-shaped support, said screws having heads outside of said support and larger than said perforations to enable pressure to be exerted on said carrier to force said mat into frictional contact with the periphery of said wheel.

5. In a road machine, the combination with a main frame, of a steering wheel unit for the rear end of said frame, a roller unit pivoted to said main frame intermediate the ends thereof on a transverse axis and comprising a self-propelled roller and a water tank, mechanism for adjusting the roller unit relative to said main frame, mechanism for distributing liquid from said tank to at least one of the wheels of the steering unit, and a piping system between said tank and said distributing mechanism comprising flexible connections adjacent to the pivoting of the roller unit relatively to the main frame and adjacent to the steering wheel unit.

6. A road-working machine comprising the combination with a vehicle frame, of a roller connected to said frame, steering wheels, means comprising wheel supports pivoted on upright axes adjacent to the centers of rotation of said wheels to an axle for steering the machine, and moistening means mounted on said wheel supports to oscillate therewith on said upright axes to keep the moistening means in predetermined association with the peripheries of the steering wheels during steering operations of the machine.

7. A road roller machine comprising the combination with a vehicle frame, of a roller connected thereto, steering wheels, an axle, wheel supports pivoted on upright axes to the ends of said axle adjacent to the centers of rotation of said wheels, brackets secured to said wheel supports to rotate bodily therewith on said upright axes, and moistening means flexibly connected to said brackets in positions to adapt such moistening means to maintain predetermined positions relative to the peripheries of said wheels irrespective of the positions of the latter relative to said vehicle frame.

8. In a road-making machine, the combination with a supporting frame having a rear axle, of a front road roller connected thereto, rear steering wheels comprising wheel supports pivoted on upright axes to the ends of said axle adjacent to the centers of rotation of said wheels, brackets mounted on said wheel supports to move bodily therewith, mechanism mounted on said brackets for spreading liquid to the peripheries of said steering wheels, steering mechanism connected to said wheel supports, means for spreading liquid to said roller, means comprising flexible hose connections between the said supporting frame and said liquid spreading mechanism associated with said steering wheels, means for controlling the spread of liquid to the roller, and independent means for controlling the spread of liquid to said steering wheels.

9. The combination with a vehicle comprising a wheel, of a mat of absorbent material adapted to engage the periphery of said wheel to wet the same, a holder for the mat comprising a U-shaped guide, a nozzle extending across the mat and into the space in said U-shaped guide, and mechanism comprising cap screws extending through openings in said U-shaped guide with the heads of said screws being in positions to engage the exterior of said U-shaped guide and hold the mat against said wheel periphery.

10. A vehicle comprising a wheel, of a mat of absorbent material, a holder for said mat comprising a U-shaped guide, a nozzle comprising a perforated pipe extending through said U-shaped holder, a screw-threaded cap closing the outer end of said pipe and acting as an abutment to prevent withdrawal of the holder and mat from the wheel periphery in one lateral direction, and mechanism for supporting said nozzle in predetermined relation to said wheel periphery and acting to prevent removal of said holder and mat from the wheel periphery in the other lateral direction.

11. The combination with a vehicle comprising a wheel, of a mat of absorbent material, a holder therefor, a nozzle extending transversely of said mat, mechanism for supporting said nozzle in predetermined relation to the periphery of said wheel, and mechanism comprising cap screws extending through holes in said holder for adjusting the holder and the mat relative to said wheel periphery.

12. The combination with a vehicle comprising a wheel, of a liquid spreading mat associated with the periphery of said wheel, a holder for said mat comprising a U-shaped guide, a nozzle comprising a perforated pipe extending into said U-shaped guide transversely of said mat, a support for said wheel, mechanism comprising a bracket mounted on said support to hold said nozzle in fixed relation to said wheel, a plurality of spaced-apart threaded sockets on said nozzle, and cap screws extending through perforations in said U-shaped guide to said threaded sockets with the heads of said cap screws outside of said U-shaped guide, said heads and screw connections being adapted to regulate the wiping pressure of said mat on the periphery of said wheel.

13. In a road machine, the combination with a vehicle comprising a wheel pivotally connected on an upright axis to the end of an axle by means of a steering knuckle located adjacent the center of the wheel, a liquid distributor, and a supporting arm mounted on said steering knuckle and connected to said liquid distributor to support the same in predetermined relation to the periphery of said wheel and for bodily movement therewith when oscillated on said upright axis.

14. In a road-working machine, the combination with a vehicle frame, of means for supporting the same comprising wheels mounted on steering knuckles pivoted to the ends of an axle on upright axes, brackets carried by said steering knuckles adjacent said wheels, liquid distributors, means for supporting said liquid distributors on said brackets to move bodily with said steering knuckles on said upright axes while said distributors are maintained in fixed positions relative to the wheels during steering movements thereof on such upright axes, and flexible conduits connected to said fluid-applying means and extending to a source of liquid supply on the vehicle frame.

15. In a vehicle, the combination with a vehicle frame comprising an axle, of a supporting ground engaging wheel, a steering knuckle pivoted to the outer end of said axle to oscillate relatively thereto on an upright axis and connected to said wheel for support thereby, a bracket arm secured to said steering knuckle to extend outwardly therefrom along the inner side of said wheel to a position adjacent the periphery thereof, and means supported by said bracket arm in association with the periphery of said wheel for moistening said periphery irrespective of the position of said wheel relative to said axle, said moistening means being bodily movable with said wheel oscillations on said upright axis by being supported on said steering knuckle by means of said bracket arm.

16. A road-working machine comprising the combination with a vehicle axle, of a wheel, a support for the wheel pivoted to said axle adjacent to the center of rotation of said wheel on an upright axis, a moistening device associated with the periphery of said wheel, and mechanism branching from said support toward the periphery of the wheel for mounting said moistening device to move bodily with said support on said upright axis to maintain said moistening device in fixed relation to such wheel periphery.

17. The combination with a vehicle comprising a ground engaging wheel, of a liquid distributor associated with the periphery of said wheel and comprising a holder lined with a mat of absorbent material adapted for wiping contact with said periphery, and mechanism for pivotally supporting said distributor on an axis extending transversely thereof intermediate the ends of both the holder and the mat with the liquid distributor resting by gravity on said wheel periphery while confined to a limited tilting movement on said axis and confined against bodily movement along the path of travel of said wheel periphery.

18. In a road-working machine, the combination with a vehicle comprising a ground engaging wheel, of a wiper associated with the periphery of said wheel, a holder for said wiper, a support extending across the top of said wiper intermediate the ends thereof, and a lost-motion pivotal connection between said support and said holder intermediate the ends of the latter to enable said wiper to rest by gravity on said wheel periphery while confined to a limited tilting movement relatively to said support with freedom of a limited radial bodily movement relative to the center of rotation of said wheel to enable said wiper and holder to automatically accommodate themselves to the periphery of said wheel throughout the length of the wiper.

19. In a road-working machine, the combination with a vehicle comprising a wheel, of a wiper associated with the periphery of said wheel, a holder for said wiper extending circumferentially along the periphery of said wheel, a support extending across the top of said wiper intermediate the ends thereof in spaced relation to the wheel periphery, and means between said support and said holder for adjustably confining said holder to predetermined positions in relation to the path of travel of said wheel periphery with freedom of limited tilting movement of said holder on an axis extending transversely of the holder at said support.

20. The combination with a vehicle comprising a wheel, of a wiping mat adapted to distribute liquid to the periphery of said wheel, a holder for said mat, mechanism for confining the holder for limited tilting movement on a transverse axis intermediate the ends of said holder and intermediate the ends of said mat to enable said mat together with its holder to automatically accommodate themselves to the periphery of said wheel thereby maintaining wiping contact of the mat throughout its length with the said periphery, and means for directing liquid to said holder adjacent said transverse axis for distribution to said mat.

21. The combination with a vehicle comprising a ground engaging wheel, of a liquid distributor associated with the periphery of said wheel and comprising a holder lined with a mat of absorbent material adapted for wiping contact with said periphery, mechanism comprising a support extending transversely of said holder intermediate the ends thereof for confining said holder with said mat in wiping contact with said periphery, and mechanism located solely on that side of said holder opposite to said mat intermediate the ends of said holder and connected to said support for adjusting the pressure of the mat against said periphery.

22. In a road-working machine, the combination with a ground engaging wheel, of a wiper adapted to engage the periphery of said wheel, a holder for said wiper, and means associated with said holder to have a lost-motion connection therewith either for adjusting the pressure of said wiper on the periphery of said wheel or for holding said wiper in position to rest by gravity on such periphery during rotation of said wheel.

23. The combination with a vehicle comprising a ground engaging wheel, of a liquid distributor associated with the periphery of said wheel and comprising a holder lined with a mat of absorbent material adapted to make a wiping contact with such periphery, a support, mechanism for mounting said support to extend transversely of said holder intermediate the ends of both the holder and the mat, and means comprising adjusting screw mechanism between said support and said holder intermediate the ends of the latter for pressing the mat against said periphery.

24. The combination with a wheel, of a liquid distributor associated with the periphery thereof and comprising a holder lined with a mat of absorbent material adapted for wiping contact with such periphery, mechanism comprising a support for confining said distributor in such relation to said periphery, a plurality of screw-threaded sockets on said support, a perforated device secured to that side of said holder opposite said mat, and a plurality of screws extending through the perforations in said device with the heads of the screws engaging the outer side of said device and with screw-threaded ends threaded into said sockets.

25. The combination with a vehicle comprising a ground engaging wheel, of a liquid distributor associated with the periphery of said wheel and comprising a holder lined with a mat of absorbent material, supporting mechanism for said liquid distributor comprising a nozzle extending transversely of the holder intermediate the ends thereof and adjacent to said mat, abutment mechanism on said nozzle, and means on that side of said holder opposite said mat for engaging said abutment mechanism to confine the distributor to a limited radial movement relative to the center of rotation of said wheel.

26. In a road-working machine, the combination with a ground engaging wheel, of a wiper adapted to engage the periphery of said wheel, a holder for said wiper having circumferentially spaced abutments extending transversely of said holder, a retaining device extending transversely of said holder between said abutments to prevent the wiper and its holder from moving circumferentially with the said periphery upon rotation of said wheel while said wiper rests by gravity on such periphery, said abutments extending radially outward and thereby permitting limited radial movement of said holder bodily relative to the center of rotation of the wheel, and mechanism between said abutments and said retaining device for exerting adjustable pressure on the holder to force the wiper into engagement with said periphery.

27. The combination with a vehicle comprising a supporting wheel, of a wiper, a holder for said wiper, a support extending transversely of the periphery of the wheel and spaced therefrom, a U-shaped guide connected to said holder intermediate the ends thereof in position to straddle said support, and means for connecting said U-shaped guide to said support to hold the wiper against such periphery for a tiltable yielding movement relative to the wheel to enable said wiper to adapt itself throughout its length to the periphery of said wheel.

28. The combination with a vehicle comprising a wheel, of a mat of absorbent material for supplying liquid to the periphery of said wheel, a holder for said mat, a U-shaped guide intermediate the ends of said holder in position to extend radially of said wheel when said mat engages said periphery, a nozzle extending transversely of said mat into said U-shaped guide, mechanism for supporting said nozzle spaced from said periphery and transversely thereof, and mechanism connecting said U-shaped guide and said nozzle to hold the guide in position to straddle said nozzle and hold the mat in engagement with said periphery.

29. As an article of manufacture, a mat holder of a liquid distributor adapted for association with the periphery of a ground engaging wheel, comprising two plates held in arcuate alinement by a connecting U-shaped plate extending transversely of the holder and radially therefrom to form a guide for a nozzle adapted to extend transversely of the holder.

30. In a roller machine, the combination with a vehicle frame, of steering wheels for supporting the one end of said vehicle frame, steering mechanism connected to said wheels, a roller unit comprising a supplemental frame pivoted to said vehicle frame on a transverse axis and comprising a ground engaging roller at the other end of said vehicle frame, a liquid supply tank on said supplemental frame, mechanism for distributing liquid to at least one of said steering wheels, a piping system between said tank and said distributing mechanism comprising a flexible conduit to facilitate pivotal adjustment of said supplemental frame relative to said vehicle frame, and means between said frames for adjusting the supplemental frame relative to said vehicle frame to secure leveling of the tank when the machine is traveling on grades during operation of said liquid distributing mechanism.

31. In a roller machine, the combination with a vehicle frame, of steering wheels for supporting one end of said vehicle frame, steering mechanism connected to said wheels, a roller unit comprising a supplemental frame pivoted to said vehicle frame on a transverse axis and comprising a ground engaging roller at the other end of said vehicle frame, a liquid supply tank on said supplemental frame, mechanism for distributing liquid to at least one of said steering wheels, mechanism for distributing liquid to the ground engaging surface of said roller, a piping system between said tank and said liquid distributing mechanisms, and means between said frames for adjusting the supplemental frame relative to said vehicle frame to secure leveling of the tank when the machine is traveling on grades during operation of either of said liquid distributing mechanisms.

32. In a roller machine, the combination with a vehicle frame, of steering wheels for supporting the rear end of said frame, steering mechanism connected to said wheels, a roller unit comprising a ground engaging roller mounted on a supplemental frame pivoted to said vehicle frame on a transverse axis, a liquid supply tank on said supplemental frame, liquid distributors associated with the peripheries of said steering wheels, piping connections between said tank and said liquid distributors comprising a flexible conduit adjacent to the pivotal connection between said frames, and means between said frames for adjusting the supplemental frame relative to said vehicle frame to secure leveling of said tank on grades.

33. In a roller machine, the combination with a vehicle frame, of steering wheels for supporting the rear end thereof, steering mechanism connected to said wheels, a self-propelled roller unit comprising a ground engaging roller mounted on a supplemental frame pivoted at its rear end on a transverse axis to said vehicle frame intermediate the ends of the latter, mechanism for distributing liquid to the periphery of at least one of said steering wheels, a liquid supply tank on said supplemental frame, liquid supply connections between said tank and said liquid distributing mechanism comprising fixed pipes on the vehicle frame connected at its ends by means of flexible pipes to said tank and to said distributing mechanism, and means between the forward ends of said frames for adjusting the supplemental frame relative to said vehicle frame to secure leveling of the said tank on grades.

34. In a roller machine, the combination with a vehicle frame, of steering wheels for supporting the rear end thereof, steering mechanism connected to said wheels, liquid distributors associated with the peripheries of said wheels, a self-propelled roller unit comprising a ground engaging roller mounted on a supplemental frame pivotally connected at its rear end to said vehicle frame intermediate the ends of the latter, a liquid distributor for the ground engaging surface of said roller, a liquid supply tank on said supplemental frame, liquid supply connections between said tank and all of said distributors, and means between the forward ends of said frames for adjusting the supplemental frame relative to said vehicle frame to secure leveling of the tank on grades.

35. In a roller machine, the combination with a vehicle frame, of steering wheels for supporting the rear end thereof, steering mechanism connected to said wheels, a liquid distributor comprising a wiper adapted to contact with the periphery of one of said wheels, mechanism for supporting said distributor for limited movement to enable it to automatically adapt itself to wiping contact with said periphery, a roller unit associated with the forward portion of said vehicle frame, a liquid supply tank, and means for directing liquid from said tank to said distributor comprising fixed conduits on said vehicle frame connected by a flexible conduit to said distributor to maintain the liquid supply connection to the latter irrespective of the steering position of said wheel.

RAYMOND W. KEELER.